(12) United States Patent
Mikashima (10) Patent No.: US 12,086,665 B2
(45) Date of Patent: Sep. 10, 2024

(54) IMAGE FORMING SYSTEM WITH DIGITAL FRONTEND THAT TRANSMITS PRINT DATA TO IMAGE FORMING APPARATUS

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/528,792

(22) Filed: Dec. 5, 2023

(65) Prior Publication Data
US 2024/0193391 A1    Jun. 13, 2024

(30) Foreign Application Priority Data

Dec. 12, 2022   (JP) .................................. 2022-197718

(51) Int. Cl.
*G06K 15/02*   (2006.01)
*G06K 15/00*   (2006.01)

(52) U.S. Cl.
CPC ....... *G06K 15/1878* (2013.01); *G06K 15/402* (2013.01)

(58) Field of Classification Search
None
See application file for complete search history.

(56) References Cited

U.S. PATENT DOCUMENTS

| | | | | |
|---|---|---|---|---|
| 2014/0240753 A1* | 8/2014 | Anno | .................... | G06F 3/1206 358/1.15 |
| 2016/0011830 A1* | 1/2016 | Asakura | ................ | H04W 76/10 358/1.15 |
| 2016/0224294 A1 | 8/2016 | Sakurai | | |

FOREIGN PATENT DOCUMENTS

| | | | | |
|---|---|---|---|---|
| CN | 103197903 A | * | 7/2013 | ........... G06F 3/1207 |
| JP | 2016143346 A | | 8/2016 | |

OTHER PUBLICATIONS

English translation of CN-103197903-A. (Year: 2013).*

* cited by examiner

*Primary Examiner* — Thomas D Lee
(74) *Attorney, Agent, or Firm* — Alleman Hall & Tuttle LLP (57) ABSTRACT

An image forming apparatus includes a print device, a first backend communication portion, a second backend communication portion, and an inquiry management portion. The inquiry management portion transmits, when determining that transmission of a permission response is possible, the permission response to a digital frontend via the first backend communication portion. The second backend communication portion receives print data from the digital frontend. The print device executes print processing that is based on the print data when the print data is received from the digital frontend by the second backend communication portion.

5 Claims, 6 Drawing Sheets

IMAGE FORMING SYSTEM WITH DIGITAL FRONTEND THAT TRANSMITS PRINT DATA TO IMAGE FORMING APPARATUS

INCORPORATION BY REFERENCE

This application is based upon and claims the benefit of priority from the corresponding Japanese Patent Application No. 2022-197718 filed on Dec. 12, 2022, the entire contents of which are incorporated herein by reference.

BACKGROUND

The present disclosure relates to an image forming system including a digital frontend and an image forming apparatus.

An image forming system including a digital frontend and an image forming apparatus is known. The digital frontend generates print data used in print processing by the image forming apparatus.

Specifically, the digital frontend receives print request data from a host apparatus. Further, the digital frontend generates the print data based on the print request data and transmits the print data to the image forming apparatus.

For example, the print request data is postscript data, and the print data is raster data.

The image forming apparatus receives the print data from the digital frontend and executes print processing that is based on the print data. Since there is no need to generate the print data, the image forming apparatus can execute the print processing at a high speed.

SUMMARY

An image forming system according to an aspect of the present disclosure includes an image forming apparatus and a digital frontend. The image forming apparatus includes a print device which executes print processing for forming an image on a sheet. The digital frontend is communicable with a host apparatus and the image forming apparatus, and generates, when print request data is received from the host apparatus, print data that is based on the print request data and transmits the print data to the image forming apparatus, to cause the image forming apparatus to execute the print processing. The digital frontend includes a first frontend communication portion, a second frontend communication portion, a request management portion, a print data generation portion, and a print data transmission portion. The first frontend communication portion is communicable with the image forming apparatus and the host apparatus. The second frontend communication portion is communicable with the image forming apparatus. The request management portion transmits, when the print request data is received from the host apparatus by the first frontend communication portion, print inquiry data corresponding to the print request data to the image forming apparatus via the first frontend communication portion, and receives a permission response corresponding to the print inquiry data via the first frontend communication portion. The print data generation portion generates the print data based on the print request data. The print data transmission portion transmits, when the permission response is received, the print data to the image forming apparatus via the second frontend communication portion. The image forming apparatus includes a first backend communication portion, a second backend communication portion, and an inquiry management portion. The first backend communication portion is communicable with the first frontend communication portion. The second backend communication portion is communicable with the second frontend communication portion. The inquiry management portion determines, when the print inquiry data is received from the digital frontend by the first backend communication portion, whether transmission of the permission response is possible based on a status of the print processing, and transmits, when determining that the transmission of the permission response is possible, the permission response to the digital frontend via the first backend communication portion. The second backend communication portion receives the print data from the digital frontend. The print device executes the print processing that is based on the print data when the print data is received from the digital frontend by the second backend communication portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming System 100]

Figure 1:
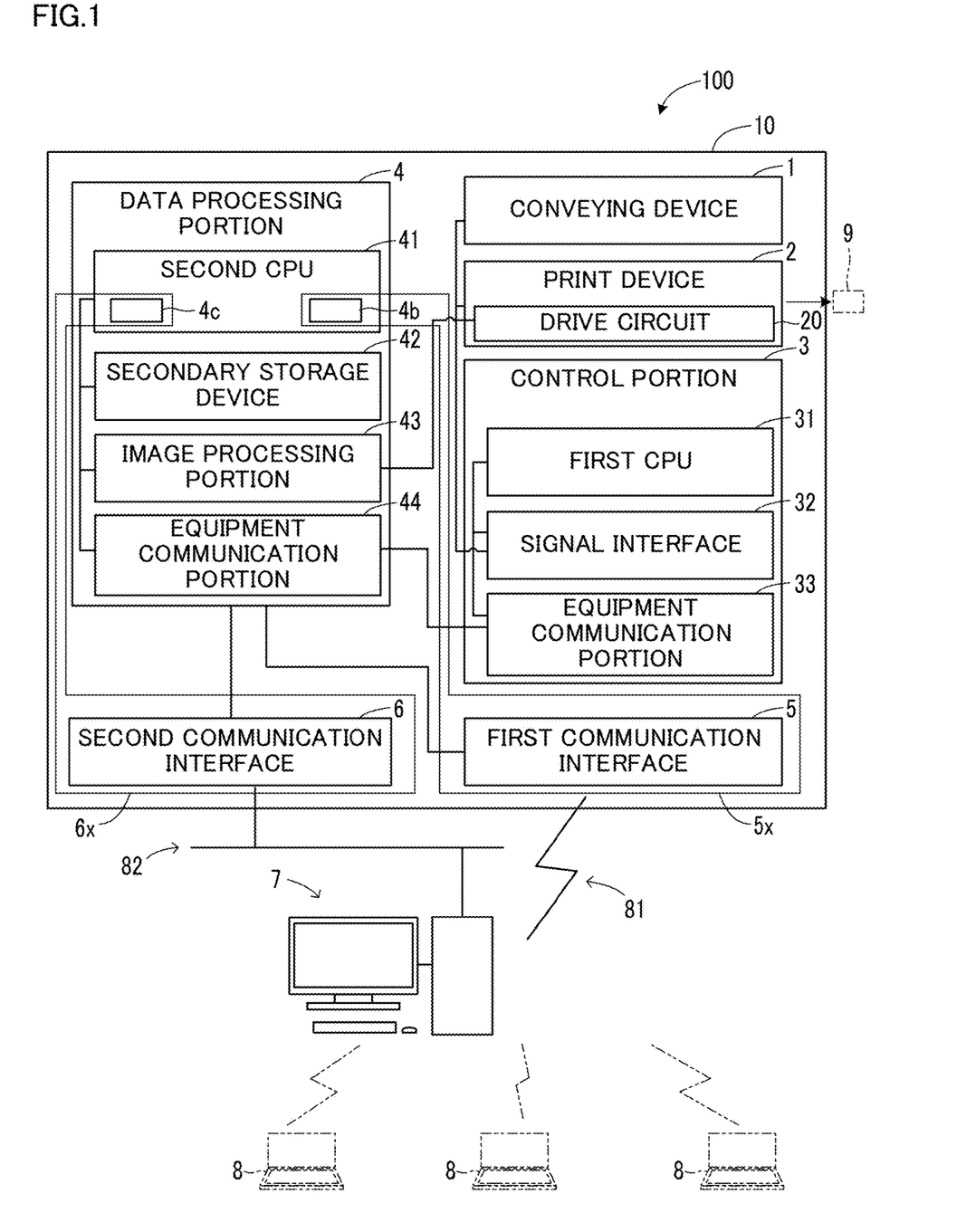
FIG. 1 is a configuration diagram of an image forming system according to an embodiment.

An image forming system 100 according to the embodiment includes an image forming apparatus 10 and a digital frontend 7.

The digital frontend 7 is communicable with the image forming apparatus 10 and host apparatuses 8. The host apparatuses 8 are each a computer, a mobile terminal, or the like that is operated by a user.

The digital frontend 7 receives print request data from the host apparatus 8. Further, the digital frontend 7 generates print data based on the print request data and transmits the print data to the image forming apparatus 10.

For example, the print request data is postscript data, and the print data is raster data.

The image forming apparatus 10 receives the print data from the digital frontend 7 and executes print processing that is based on the print data. The print processing is processing of forming an image on a sheet 9. The sheet 9 is an image forming medium such as paper and a resin sheet.

When the print request data is received from the host apparatus 8, the digital frontend 7 generates the print data based on the print request data. Further, the digital frontend 7 transmits the print data to the image forming apparatus 10 to thus cause the image forming apparatus 10 to execute the print processing.

Since there is no need to generate the print data, the image forming apparatus 10 can execute the print processing at a high speed.

The image forming apparatus 10 includes a conveying device 1, a print device 2, a control portion 3, and a data processing portion 4.

The conveying device 1 conveys the sheet 9 along a sheet conveying path. The sheet conveying path is provided inside the image forming apparatus 10.

The print device 2 executes the print processing on the sheet 9 conveyed along the sheet conveying path. For example, the print device 2 executes the print processing using electrophotography or an inkjet system.

The control portion 3 controls the conveying device 1 and the print device 2. The control portion 3 causes the print device 2 to execute the print processing that is based on the print data.

The data processing portion 4 receives the print data from the digital frontend 7 and transfers the print data to the control portion 3. In descriptions below, processing in which the data processing portion 4 receives the print data from the digital frontend 7 and transfers the print data to the control portion 3 will be referred to as print data reception processing.

Incidentally, in a case where the image forming apparatus 10 performs communication of the print data and other data with the digital frontend 7 using one communication interface, there is a fear that a speed of the print data reception processing will fall.

Specifically, while the print data reception processing that uses a communication interface is being executed, if another interrupt processing that uses the same communication interface occurs in the image forming apparatus 10, there is a fear that the speed of the print data reception processing will fall.

The fall of the speed of the print data reception processing leads to a fall of the speed of the print processing.

On the other hand, the image forming system 100 has a configuration for executing the print data reception processing stably at a high speed without being affected by other data communication. Hereinafter, that configuration will be described.

[Configuration of Image Forming Apparatus 10]

The image forming apparatus 10 further includes a first communication interface 5 and a second communication interface 6 (see FIG. 1).

The image forming apparatus 10 includes two CPUs (Central Processing Units) 31 and 41. The two CPUs 31 and 41 each execute computer programs to execute various types of control and data processing.

The control portion 3 includes the first CPU 31, a signal interface 32, and a device communication portion 33. The first CPU 31 is one of the two CPUs 31 and 41.

The signal interface 32 converts sense signals of various sensors into digital sense data. The sense data is transmitted to the first CPU 31.

The device communication portion 33 is a communication interface that executes communication with the second CPU 41 within the apparatus. For example, the device communication portion 33 executes serial data communication. The first CPU 31 receives and transmits data from/to the second CPU 41 via the device communication portion 33.

The data processing portion 4 includes the second CPU 41, a secondary storage device 42, an image processing portion 43, and a device communication portion 44. The second CPU 41 is one of the two CPUs 31 and 41.

The secondary storage device 42 is a nonvolatile computer-readable storage device. For example, one or both of a flash memory and a hard disk drive is/are adopted as the secondary storage device 42. The secondary storage device 42 stores programs to be executed by the second CPU 41 and various types of data.

The device communication portion 44 is a communication interface that executes communication with the first CPU 31 within the apparatus. For example, the device communication portion 44 executes serial data communication.

In other words, the first CPU 31 and the second CPU 41 mutually receive and transmit data via the device communication portions 33 and 44.

The image processing portion 43 executes image processing on the print data. Further, the image processing portion 43 outputs the processed print data to the print device 2.

For example, when the print device 2 is an inkjet recording device which executes the print processing using an inkjet system, the print device 2 includes a drive circuit 20 which drives a plurality of inkjet units (see FIG. 1). In this case, the image processing portion 43 outputs the print data subjected to the image processing to the drive circuit 20.

The drive circuit 20 drives the plurality of inkjet units based on the print data obtained from the image processing portion 43.

The first CPU 31 includes a plurality of processing modules that are realized by executing the computer programs. The plurality of processing modules of the first CPU 31 include a conveyance control portion 3a and a print control portion 3b (see FIG. 2).

Figure 2:
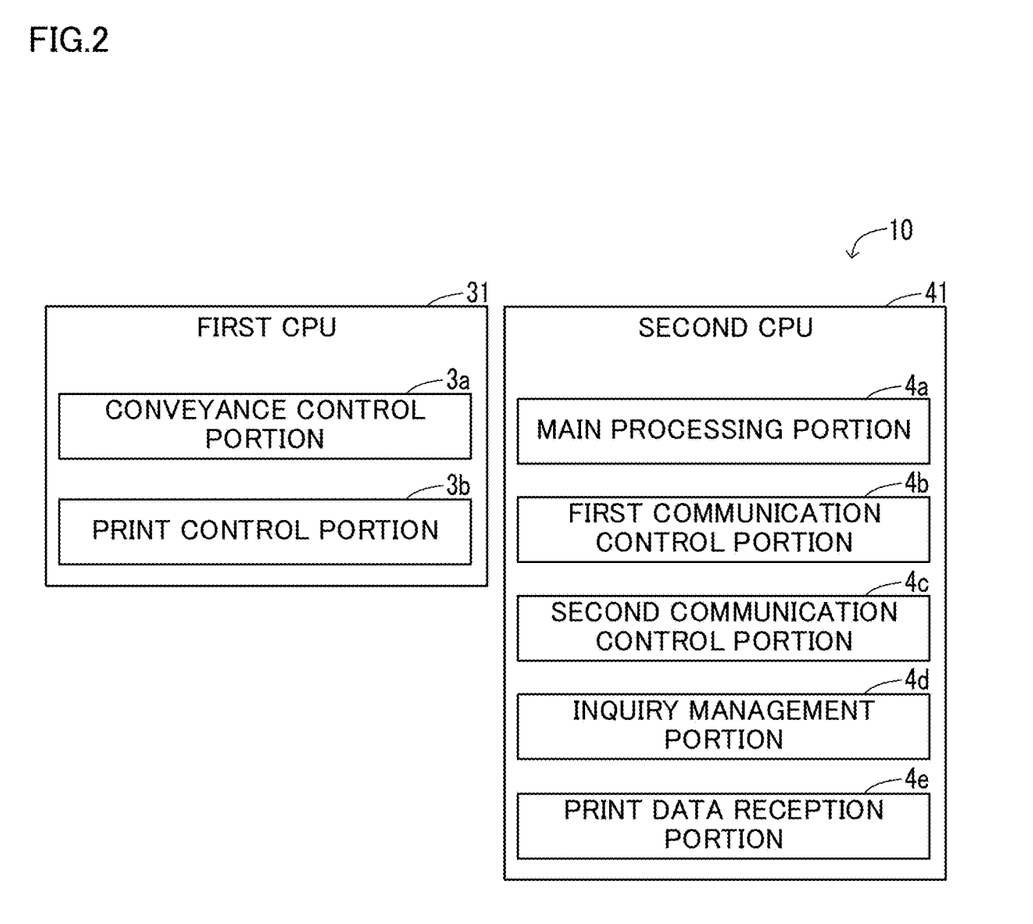
FIG. 2 is a block diagram showing a configuration of a plurality of processing modules in two CPUs of an image forming apparatus included in the image forming system according to the embodiment.

The conveyance control portion 3a controls the conveying device 1. For example, the conveyance control portion 3a controls a conveyance timing of the sheet 9 based on a sense result of a sheet sensor which senses the sheet 9 on the sheet conveying path.

The print control portion 3b controls the print device 2. For example, the print control portion 3b controls a drive timing of the plurality of inkjet units by the drive circuit 20 based on the sense result of the sheet sensor.

The plurality of processing modules of the second CPU 41 include a main processing portion 4a, a first communication control portion 4b, a second communication control portion 4c, and an inquiry management portion 4d (see FIG. 2).

The main processing portion 4a executes processing of causing a selection menu screen to be displayed on a human interface (not shown). Further, the main processing portion 4a executes processing corresponding to an operation made to the human interface.

The first communication control portion 4b and the first communication interface 5 constitute a first backend communication portion 5x which executes communication processing via a first network 81 (see FIG. 1 and FIG. 2). For example, the first network 81 is a wired LAN (Local Area Network) or a wireless LAN.

The first communication interface 5 is a portion of the first backend communication portion 5x that is realized by hardware. The first communication control portion 4b is a portion of the first backend communication portion 5x that is realized by software.

The first communication interface 5 is hardware that realizes at least a physical layer in an OSI reference model. The first communication interface 5 is an example of a general-purpose communication interface device.

The first communication control portion 4b realizes at least a network layer and layers of a higher level than the network layer in the OSI reference model.

The first CPU 31 executes a predetermined communication program to thus function as the first communication control portion 4b. The first CPU 31 that functions as the first communication control portion 4b is an example of a general-purpose communication control portion.

For example, the first communication interface 5 realizes the physical layer and a data link layer in the OSI reference model. In this case, the first communication control portion 4b realizes the network layer, a transport layer, a session layer, a presentation layer, and an application layer in the OSI reference model.

In the present embodiment, the first communication interface 5 conforms to the IEEE 802.11 or IEEE 802.3 standard.

The second communication control portion 4c and the second communication interface 6 constitute a second backend communication portion 6x which executes communication processing via a second network 82 (see FIG. 1 and FIG. 2). The second network 82 is, for example, a wired LAN.

The second communication interface 6 is a portion of the second backend communication portion 6x that is realized by hardware. The second communication control portion 4c is a portion of the second backend communication portion 6x that is realized by software.

The second communication interface 6 is hardware that realizes the physical layer, the data link layer, the network layer, and the transport layer in the OSI reference model. The second communication interface 6 is an example of a specific communication interface device.

For example, the second communication interface 6 includes a circuit and connector that realize the physical layer and an ASIC (Application Specific Integrated Circuit) that realizes the data link layer, the network layer, and the transport layer.

In the present embodiment, the second communication interface 6 conforms to the IEEE 802.3 standard. It is noted that the second communication interface 6 may alternatively conform to the IEEE 802.11 standard.

The second communication control portion 4c realizes portions other than the portion realized by the second communication interface 6 in the OSI reference model.

The second CPU 41 executes a predetermined communication program to thus function as the second communication control portion 4c. The second CPU 41 that functions as the second communication control portion 4c is an example of a specific communication control portion.

In the present embodiment, the second communication control portion 4c is a module dedicated to the processing of receiving the print data via the second communication interface 6 and the processing of transferring the print data. The second backend communication portion 6x does not include the session layer, the presentation layer, and the application layer in the OSI reference model.

[Configuration of Digital Frontend 7]

Figure 3:
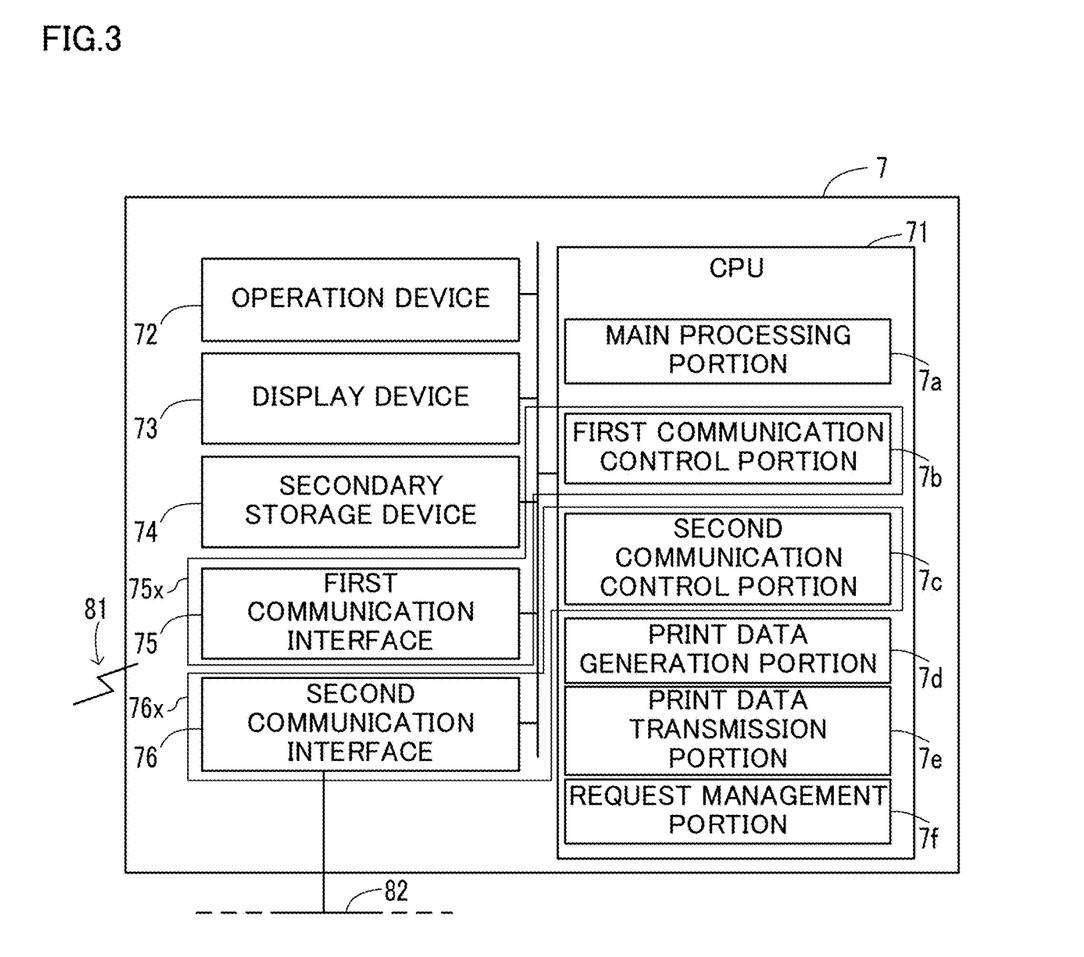
FIG. 3 is a block diagram showing a configuration of a digital frontend included in the image forming system according to the embodiment.

The digital frontend 7 includes a CPU 71, an operation device 72, a display device 73, a secondary storage device 74, a first communication interface 75, and a second communication interface 76 (see FIG. 3).

The CPU 71 executes computer programs to thus execute various types of control and data processing.

The CPU 71 includes a plurality of processing modules that are realized by executing the computer programs. The plurality of processing modules of the CPU 71 include a main processing portion 7a, a first communication control portion 7b, a second communication control portion 7c, a print data generation portion 7d, a print data transmission portion 7e, a request management portion 7f, and the like (see FIG. 3).

The operation device 72 is a device which accepts human operations. For example, the operation device 72 includes a part or all of a keyboard, a mouse, and a touch panel.

The display device 73 is capable of displaying various types of information. For example, the display device 73 is a panel display device such as a liquid crystal display device.

The secondary storage device 74 is a nonvolatile computer-readable storage device. For example, one or both of a flash memory and a hard disk drive is/are adopted as the secondary storage device 74. The secondary storage device 74 stores programs to be executed by the CPU 71 and various types of data.

The first communication control portion 7b and the first communication interface 75 constitute a first frontend communication portion 75x which executes communication processing via the first network 81 (see FIG. 3). The first communication interface 75 is a portion of the first frontend communication portion 75x that is realized by hardware. The first communication control portion 7b is a portion of the first frontend communication portion 75x that is realized by software.

The first communication interface 75 is hardware that realizes at least the physical layer in the OSI reference model.

The first communication control portion 7b realizes at least the network layer and layers of a higher level than the network layer in the OSI reference model.

The CPU 71 executes a predetermined communication program to thus function as the first communication control portion 7b.

For example, the first communication interface 75 realizes the physical layer and the data link layer in the OSI reference model. In this case, the first communication control portion 7b realizes the network layer, the transport layer, the session layer, the presentation layer, and the application layer in the OSI reference model.

The second communication control portion 7c and the second communication interface 76 constitute a second frontend communication portion 76x which executes communication processing via the second network 82 (see FIG. 3). The second communication interface 76 is a portion of the second frontend communication portion 76x that is realized by hardware. The second communication control portion 7c is a portion of the second frontend communication portion 76x that is realized by software.

The second communication interface 76 is hardware that realizes at least the physical layer in the OSI reference model.

The second communication control portion 7c realizes portions other than the portion realized by the second communication interface 76 in the OSI reference model.

The CPU 71 executes a predetermined communication program to thus function as the second communication control portion 7c.

For example, the second communication interface 76 realizes the physical layer and the data link layer in the OSI reference model. In this case, the second communication control portion 7c realizes the network layer, the transport layer, the session layer, and the presentation layer in the OSI reference model.

The first frontend communication portion 75x is communicable with the first backend communication portion 5x of the image forming apparatus 10 and the host apparatus 8 via the first network 81. In other words, the first backend communication portion 5x is communicable with the first frontend communication portion 75x via the first network 81.

The second frontend communication portion 76x is communicable with the second backend communication portion 6x of the image forming apparatus 10 via the second network 82. In other words, the second backend communication portion 6x is communicable with the second frontend communication portion 76x via the second network 82.

The print data generation portion 7d generates the print data based on the print request data. For example, the print data generation portion 7d executes color correction processing and raster conversion processing.

The color correction processing is processing of correcting a color of an image that the print request data expresses in accordance with color output performance of the image forming apparatus 10. For example, the color correction processing includes gamma correction processing. The raster conversion processing is processing of converting data of an image subjected to the color correction into the print data which is raster data.

The print data transmission portion 7e transmits the print data to the image forming apparatus 10 via the second frontend communication portion 76x.

The request management portion 7f receives the print request data from the host apparatus 8 via the first frontend communication portion 75x. Further, when the print request data is received, the request management portion 7f executes print inquiry processing.

The print inquiry processing is processing of inquiring of the image forming apparatus 10 about whether transmission of the print data is possible. The request management portion 7f executes the print inquiry processing via the first frontend communication portion 75x.

When a permission response is received in the print inquiry processing, the print data transmission portion 7e transmits the print data to the image forming apparatus 10.

[Frontend Processing]

Next, exemplary procedures of frontend processing executed by the CPU 71 will be described with reference to the flowchart shown in FIG. 4.

When data reception via the first frontend communication portion 75x occurs, the CPU 71 executes the frontend processing.

In descriptions below, S101, S102, . . . respectively represent identification codes of a plurality of steps in the frontend processing. In the frontend processing, the CPU 71 first executes processing of Step S101.

<Step S101>

In Step S101, the request management portion 7f determines which of the print request data and other data the reception data received via the first frontend communication portion 75x is.

When determining that the reception data is the print request data, the request management portion 7f shifts the processing to Step S102. On the other hand, when determining that the reception data is other data, the request management portion 7f shifts the processing to Step S107.

<Step S102>

In Step S102, the request management portion 7f receives the print request data from the host apparatus 8 via the first frontend communication portion 75x. The request management portion 7f temporarily stores the print request data in the secondary storage device 74.

The request management portion 7f shifts the processing from Step S102 to Step S103.

<Step S103>

In Step S103, the request management portion 7f transmits print inquiry data to the image forming apparatus 10 via the first frontend communication portion 75x.

The print inquiry data is data for making an inquiry on whether transmission of the print data corresponding to the print request data is possible.

The request management portion 7f shifts the processing from Step S103 to Step S104.

<Step S104>

In Step S104, the print data generation portion 7d generates the print data corresponding to the print request data received in Step S102.

The print data generation portion 7d shifts the processing from Step S104 to Step S105.

<Step S105>

In Step S105, the request management portion 7f receives a response corresponding to the print inquiry data via the first frontend communication portion 75x.

When a refusal response corresponding to the print inquiry data is received, the request management portion 7f continues the processing of Step S105. On the other hand, when a permission response corresponding to the print inquiry data is received, the request management portion 7f shifts the processing to Step S106.

<Step S106>

In Step S106, the print data transmission portion 7e transmits the print data corresponding to the permission response to the image forming apparatus 10 via the second frontend communication portion 76x.

The print data transmitted in Step S106 is data generated in Step S104. After the processing of Step S106 is executed, the frontend processing is ended.

[Inquiry Management Processing]

Figure 5:
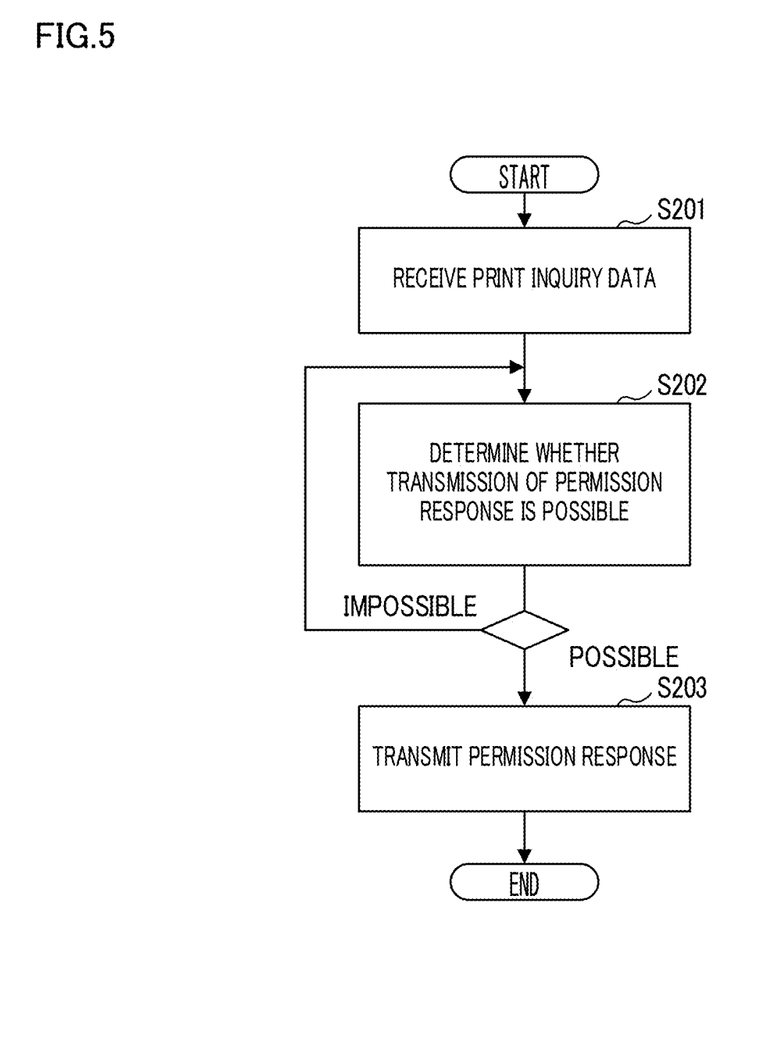
FIG. 5 is a flowchart showing exemplary procedures of inquiry management processing in the image forming system according to the embodiment.

Next, exemplary procedures of inquiry management processing executed by the inquiry management portion 4d of the second CPU 41 will be described with reference to the flowchart shown in FIG. 5.

When reception of the print inquiry data via the first backend communication portion 5x occurs, the inquiry management portion 4d executes the inquiry management processing.

In descriptions below, S201, S202, . . . respectively represent identification codes of a plurality of steps in the inquiry management processing. In the inquiry management processing, the inquiry management portion 4d first executes processing of Step S201.

<Step S201>

In Step S201, the inquiry management portion 4d receives the print inquiry data from the digital frontend 7 via the first backend communication portion 5x.

After receiving the print inquiry data, the inquiry management portion 4d shifts the processing to Step S202.

<Step S202>

In Step S202, the inquiry management portion 4d determines whether transmission of the permission response is possible based on a status of the print processing in the image forming apparatus 10.

The inquiry management portion 4d determines that the transmission of the permission response is impossible when the processing of receiving the print data is being executed. On the other hand, the inquiry management portion 4d determines that the transmission of the permission response is possible when the processing of receiving the print data is not executed.

When determining that the transmission of the permission response is impossible, the inquiry management portion 4d continues the processing of Step S202. On the other hand, when determining that the transmission of the permission response is possible, the inquiry management portion 4d shifts the processing to Step S203.

<Step S203>

In Step S203, the inquiry management portion 4d transmits the permission response to the digital frontend 7 via the first backend communication portion 5x.

After the processing of Step S203 is executed, the inquiry management processing is ended.

[Print Control]

Figure 6:
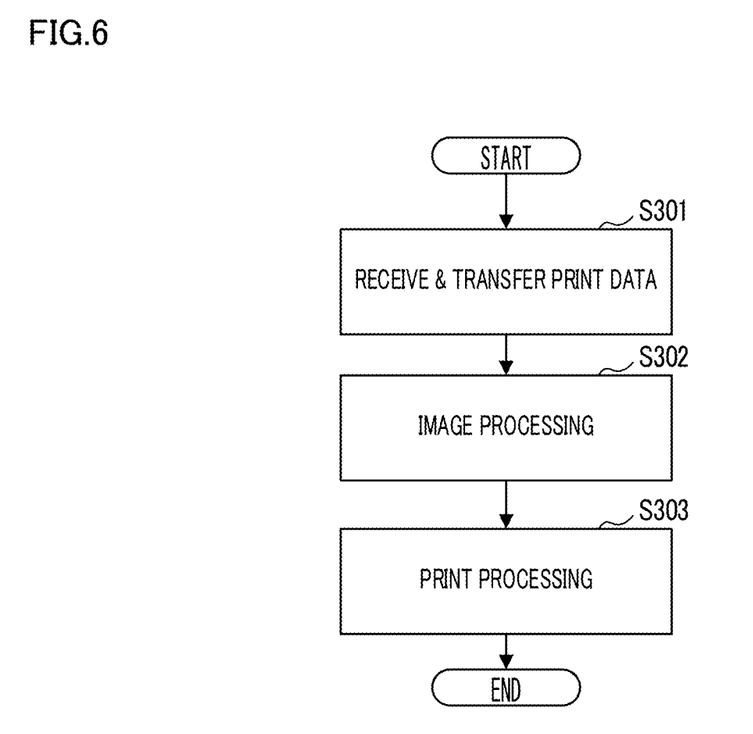
FIG. 6 is a flowchart showing exemplary procedures of print control in the image forming system according to the embodiment.

Next, exemplary procedures of print control executed by the second communication control portion 4c of the second CPU 41, the print control portion 3b of the first CPU 31, and the image processing portion 43 will be described with reference to the flowchart shown in FIG. 6.

When reception of the print data via the second backend communication portion 6x occurs, the second communication control portion 4c starts the print control.

In descriptions below, S301, S302, . . . respectively represent identification codes of a plurality of steps in the print control. In the print control, the second communication control portion 4c first executes processing of Step S301.

<Step S301>

In Step S301, the second communication control portion 4c receives the print data from the digital frontend 7 via the second communication interface 6.

Further, the second communication control portion 4c transfers the print data to the image processing portion 43. For example, the second communication control portion 4c transfers the print data to the image processing portion 43 by DMA (Direct Memory Access). The image processing portion 43 is an example of a device other than the second backend communication portion 6x in the image forming apparatus 10.

The second communication control portion 4c shifts the processing from Step S301 to Step S302.

<Step S302>

In Step S302, the image processing portion 43 corrects the print data according to characteristic features of the print device 2. For example, in a case where the print device 2 is the inkjet recording device, the image processing portion 43 corrects the print data according to characteristic features, positions, and the like of a plurality of ink discharge portions.

The image processing portion 43 outputs the corrected print data to the drive circuit 20 of the print device 2. The image processing portion 43 shifts the processing from Step S302 to Step S303.

<Step S303>

In Step S303, the print device 2 executes the print processing based on the print data obtained from the image processing portion 43. In the print processing, the drive circuit 20 drives the plurality of inkjet units according to the print data.

After the processing of Step S303 is executed, the print control is ended.

Figure 4:
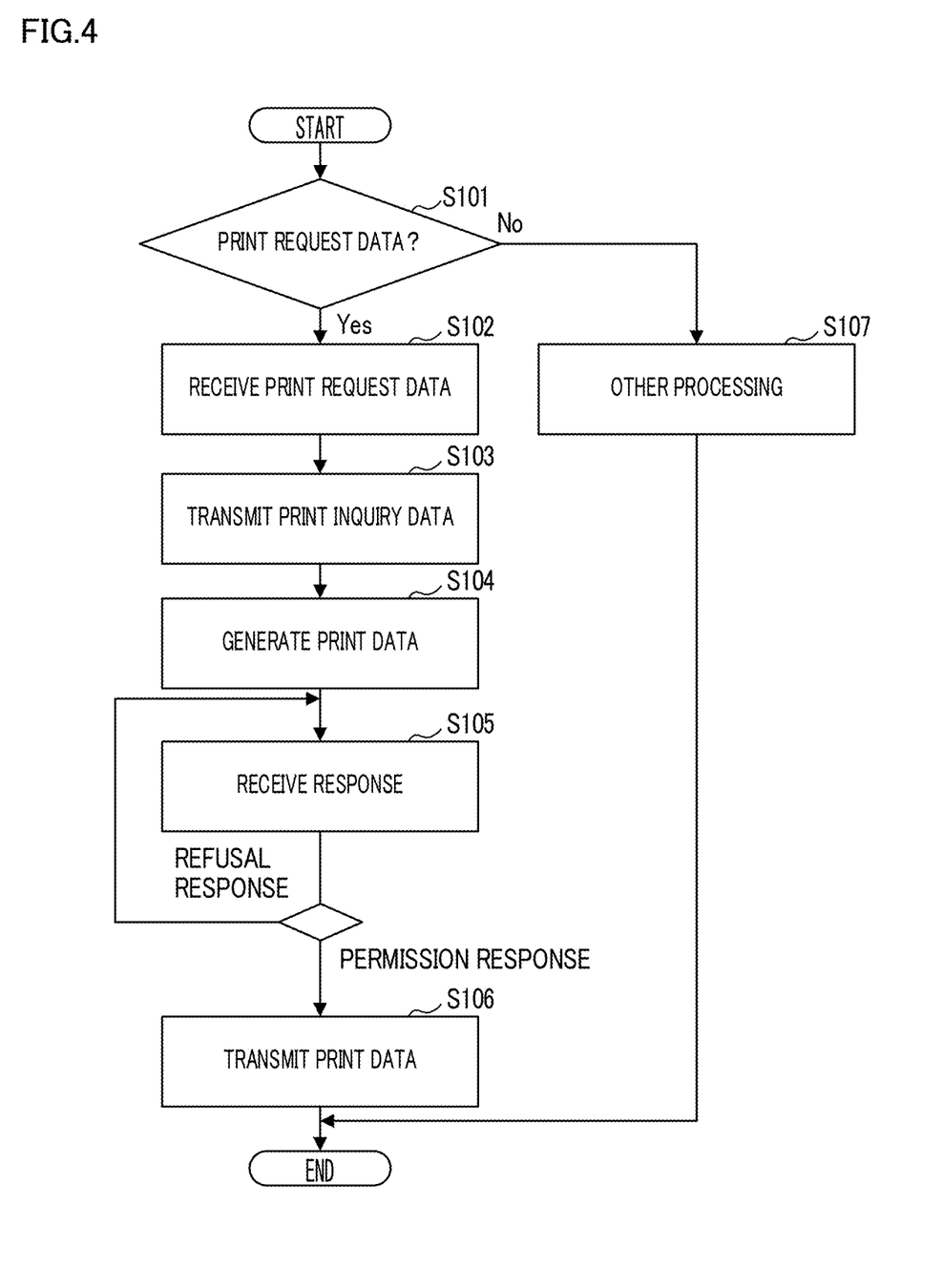
FIG. 4 is a flowchart showing exemplary procedures of frontend processing in the image forming system according to the embodiment.

As described above, the request management portion 7f executes the processing of Step S103 when the print request data is received from the host apparatus 8 by the first frontend communication portion 75x (see FIG. 4).

In Step S103, the request management portion 7f transmits the print inquiry data corresponding to the print request data to the image forming apparatus 10 via the first frontend communication portion 75x.

Further, the request management portion 7f receives the permission response corresponding to the print inquiry data via the first frontend communication portion 75x (Step S105).

When the permission response is received, the print data transmission portion 7e transmits the print data to the image forming apparatus 10 via the second frontend communication portion 76x (Step S106).

On the other hand, the inquiry management portion 4d executes the processing of Step S202 when the print inquiry data is received from the digital frontend 7 by the first backend communication portion 5x.

In Step S202, the inquiry management portion 4d determines whether the transmission of the permission response is possible based on the status of the print processing. Further, when determining that the transmission of the permission response is possible, the inquiry management portion 4d transmits the permission response to the digital frontend 7 via the first backend communication portion 5x.

After the permission response is transmitted, the second communication control portion 4c receives the print data from the digital frontend 7 via the second backend communication portion 6x (Step S301).

When the print data is received from the digital frontend 7 by the second backend communication portion 6x, the print device 2 executes the print processing that is based on the print data (Step S303).

By adopting the image forming system 100, other interrupt processing using the second backend communication portion 6x does not occur while the print data reception processing via the second backend communication portion 6x is being executed in the image forming apparatus 10.

Consequently, the reception speed of the print data does not fall in the image forming apparatus 10. As a result, the processing of receiving the print data from the digital frontend 7 by the image forming apparatus 10 is executed stably at a high speed without being affected by other data communication.

Moreover, in the second backend communication portion 6x, the second communication interface 6 realizes the physical layer, the data link layer, the network layer, and the transport layer in the OSI reference model.

Thus, it is difficult for the load of the second CPU 41 to affect the reception speed of the print data. As a result, the processing of receiving the print data is executed more stably at a high speed.

[Note of Disclosure]

Hereinafter, a general outline of the disclosure extracted from the embodiment described above will be noted. It is noted that the respective configurations and respective processing functions described in the notes below can be selected and combined as appropriate.

<Note 1>

An image forming system, including:
an image forming apparatus including a print device which executes print processing for forming an image on a sheet; and
a digital frontend which is communicable with a host apparatus and the image forming apparatus, and generates, when print request data is received from the host apparatus, print data that is based on the print request data and transmits the print data to the image forming apparatus, to cause the image forming apparatus to execute the print processing, in which
the digital frontend includes
a first frontend communication portion communicable with the image forming apparatus and the host apparatus,
a second frontend communication portion communicable with the image forming apparatus,
a request management portion which transmits, when the print request data is received from the host apparatus by the first frontend communication portion, print inquiry data corresponding to the print request data to the image forming apparatus via the first frontend communication portion, and receives a permission response corresponding to the print inquiry data via the first frontend communication portion,
a print data generation portion which generates the print data based on the print request data, and
a print data transmission portion which transmits, when the permission response is received, the print data to the image forming apparatus via the second frontend communication portion,
the image forming apparatus includes
a first backend communication portion communicable with the first frontend communication portion,
a second backend communication portion communicable with the second frontend communication portion, and
an inquiry management portion which determines, when the print inquiry data is received from the digital frontend by the first backend communication portion, whether transmission of the permission response is possible based on a status of the print processing, and transmits, when determining that the transmission of the permission response is possible, the permission response to the digital frontend via the first backend communication portion,
the second backend communication portion receives the print data from the digital frontend, and
the print device executes the print processing that is based on the print data when the print data is received from the digital frontend by the second backend communication portion.

<Note 2>

The image forming system according to Note 1 above, in which
the first backend communication portion and the second backend communication portion each include hardware that realizes a physical layer in an OSI reference model.

<Note 3>

The image forming system according to Note 2 above, in which
the second backend communication portion includes
a specific communication interface device which is hardware that realizes the physical layer, a data link layer, a network layer, and a transport layer in the OSI reference model, and
a specific communication control portion which executes a communication program to receive the print data via the specific communication interface device and transfer the print data to a device of the image forming apparatus other than the second backend communication portion using direct memory access.

<Note 4>

The image forming system according to Note 3 above, in which
the first backend communication portion includes
a general-purpose communication interface device which is hardware that realizes at least the physical layer in the OSI reference model, and
a general-purpose communication control portion which executes a communication program to realize at least the network layer and a layer of a higher level than the network layer in the OSI reference model.

<Note 5>

The image forming system according to any one of Notes 1 to 4 above, in which
the print data generation portion executes
processing of correcting a color of an image that the print request data expresses, and
processing of converting data of an image that has been subjected to color correction into the print data which is raster data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system, comprising:
an image forming apparatus including a print device which executes print processing for forming an image on a sheet; and
a digital frontend which is communicable with a host apparatus and the image forming apparatus, and generates, when print request data is received from the host apparatus, print data that is based on the print request data and transmits the print data to the image forming apparatus, to cause the image forming apparatus to execute the print processing, wherein
the digital frontend includes
a first frontend communication portion communicable with the image forming apparatus and the host apparatus,
a second frontend communication portion communicable with the image forming apparatus,
a request management portion which transmits, when the print request data is received from the host apparatus by the first frontend communication portion, print inquiry data corresponding to the print request data to the image forming apparatus via the first frontend communication portion, and receives a permission response corresponding to the print inquiry data via the first frontend communication portion, a print data generation portion which generates the print data based on the print request data, and a print data transmission portion which transmits, when the permission response is received, the print data to the image forming apparatus via the second frontend communication portion, the image forming apparatus includes a first backend communication portion communicable with the first frontend communication portion, a second backend communication portion communicable with the second frontend communication portion, and an inquiry management portion which determines, when the print inquiry data is received from the digital frontend by the first backend communication portion, whether transmission of the permission response is possible based on a status of the print processing, and transmits, when determining that the transmission of the permission response is possible, the permission response to the digital frontend via the first backend communication portion, the second backend communication portion receives the print data from the digital frontend, and the print device executes the print processing that is based on the print data when the print data is received from the digital frontend by the second backend communication portion.

2. The image forming system according to claim 1, wherein the first backend communication portion and the second backend communication portion each include hardware that realizes a physical layer in an OSI reference model.

3. The image forming system according to claim 2, wherein the second backend communication portion includes a specific communication interface device which is hardware that realizes the physical layer, a data link layer, a network layer, and a transport layer in the OSI reference model, and a specific communication control portion which executes a communication program to receive the print data via the specific communication interface device and transfer the print data to a device of the image forming apparatus other than the second backend communication portion using direct memory access.

4. The image forming system according to claim 3, wherein the first backend communication portion includes a general-purpose communication interface device which is hardware that realizes at least the physical layer in the OSI reference model, and a general-purpose communication control portion which executes a communication program to realize at least the network layer and a layer of a higher level than the network layer in the OSI reference model.

5. The image forming system according to claim 1, wherein the print data generation portion executes processing of correcting a color of an image that the print request data expresses, and processing of converting data of an image that has been subjected to color correction into the print data which is raster data.

* * * * *